United States Patent
Nakamura et al.

(10) Patent No.: US 6,516,318 B2
(45) Date of Patent: Feb. 4, 2003

(54) MANAGEMENT SYSTEM AND TERMINAL APPARATUS TO MANAGE AND CONTROL DISTRIBUTION AND USE OF SOFTWARE AND THE LIKE

(75) Inventors: Kenji Nakamura, Kawasaki (JP); Keiichi Iwamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/512,030

(22) Filed: Feb. 24, 2000

(65) Prior Publication Data

US 2002/0169742 A1 Nov. 14, 2002

Related U.S. Application Data

(62) Division of application No. 08/547,389, filed on Oct. 24, 1995.

(30) Foreign Application Priority Data

Oct. 26, 1994 (JP) .............................. 6-262597

(51) Int. Cl.⁷ .................. G06F 17/30; G06F 7/00
(52) U.S. Cl. .................... 707/10; 705/51; 717/172; 717/177; 709/217
(58) Field of Search ................... 705/51–54, 57–59; 707/10; 717/170–178; 709/217

(56) References Cited

U.S. PATENT DOCUMENTS

| | | | | | |
|---|---|---|---|---|---|
| 4,658,093 A | * | 4/1987 | Hellman | ...................... | 705/52 |
| 4,685,055 A | * | 8/1987 | Thomas | ...................... | 705/56 |
| 4,800,562 A | * | 1/1989 | Hicks | ........................... | 371/5 |
| 4,888,798 A | * | 12/1989 | Earnest | ......................... | 70/54 |
| 4,999,806 A | * | 3/1991 | Chernow et al. | ............. | 717/11 |
| 5,023,907 A | * | 6/1991 | Johnson et al. | ............. | 710/200 |
| 5,058,162 A | * | 10/1991 | Santon et al. | .................. | 705/51 |
| 5,084,816 A | * | 1/1992 | Boese et al. | ................. | 395/575 |
| 5,138,712 A | * | 8/1992 | Corbin | ........................ | 395/700 |
| 5,191,611 A | * | 3/1993 | Lang | ............................. | 705/53 |
| 5,204,897 A | * | 4/1993 | Wyman | ...................... | 710/200 |
| 5,222,134 A | * | 6/1993 | Waite et al. | .................. | 705/59 |
| 5,260,999 A | * | 11/1993 | Wyman | ........................ | 705/59 |
| 5,390,297 A | * | 2/1995 | Barber et al. | .......... | 395/187.01 |
| 5,438,508 A | * | 8/1995 | Wyman | .......................... | 705/8 |
| 5,442,541 A | * | 8/1995 | Hube et al. | .................... | 700/9 |
| 5,495,411 A | * | 2/1996 | Ananda | ........................ | 705/32 |
| 5,497,479 A | * | 3/1996 | Hornbuckle | ................. | 463/29 |
| 5,548,645 A | * | 8/1996 | Ananda | ........................ | 705/52 |
| 5,559,999 A | * | 9/1996 | Maturi et al. | ............... | 395/550 |
| 5,577,257 A | * | 11/1996 | Nakamura | .................. | 395/800 |
| 5,592,375 A | * | 1/1997 | Salmon et al. | ............. | 395/207 |
| 5,632,681 A | * | 5/1997 | Bakoglu et al. | ............. | 463/44 |
| 5,638,513 A | * | 6/1997 | Ananda | ....................... | 713/202 |
| 5,701,463 A | * | 12/1997 | Malcolm | ............... | 395/187.01 |
| 5,966,449 A | * | 10/1999 | Iwamura et al. | ............ | 380/44 |
| 5,999,741 A | * | 12/1999 | May et al. | ................. | 717/173 |
| 6,134,663 A | * | 10/2000 | Nakamura et al. | ........ | 713/201 |
| 2002/0082917 A1 | * | 6/2002 | Takano | ....................... | 705/14 |

FOREIGN PATENT DOCUMENTS

| EP | 0809221 A2 | * | 11/1997 | ........... | G07F/17/16 |
|---|---|---|---|---|---|
| WO | WO 01/80048 | * | 10/2001 | ........... | G06F/17/00 |

* cited by examiner

*Primary Examiner*—Jean R. Homere
*Assistant Examiner*—Luke S. Wassum
(74) *Attorney, Agent, or Firm*—Fitzpatrick, Cella, Harper & Scinto

(57) ABSTRACT

A management system for software data in a system in which software data that is transmitted from a management center through a predetermined transmitting system can be used at a terminal. The management center transmits the software data and regulation data to regulate a use style of the software data. The terminal regulates the use of the software data on the basis of the regulation data.

12 Claims, 13 Drawing Sheets

MANAGEMENT SYSTEM AND TERMINAL APPARATUS TO MANAGE AND CONTROL DISTRIBUTION AND USE OF SOFTWARE AND THE LIKE

This application is a division of application Ser. No. 08/547,389, filed on Oct. 24, 1995.

BACKGROUND OF THE INVENTION

1. Field of the Invention

The invention relates to a management system and a terminal apparatus when a software formed by a proper creator is used.

2. Related Background Art

In association with the recent realization of multimedia technology, the user can easily access games created by a third party and software of various kinds of information through a network line and use them.

Since software is digitized data, it can be easily processed or updated.

As mentioned above, since the user can freely use and update or upgrade software created by the proper creators, there is a problem of effectively protecting the copyright of the creators.

It is also difficult to request the payment in legal compensation for software used.

SUMMARY OF THE INVENTION

The present invention is made in consideration of the circumstances mentioned above, and it is an object of the invention to apply a management system which can reliably protect software made by a proper creator.

To accomplish the above object, according to a preferred embodiment of the invention, there is provided a management system of software data in a system which can use, at a terminal, software data that is transmitted from a management center through a predetermined transmission system, wherein the management center transmits both the software data and regulation data to regulate a use style, and the terminal regulates the use of the software data on the basis of the regulation data.

To accomplish the above object, according to another embodiment of the invention, there is provided a terminal apparatus for inputting both software data and regulation data through a predetermined transmission system, wherein the terminal apparatus has regulating means for regulating the use of the software data on the basis of the regulation data.

To accomplish the above object, according to still another embodiment of the invention, there is provided a terminal apparatus for inputting both software data and regulation data through a predetermined transmission system, wherein the terminal apparatus has: regulating means for regulating the use the software data on the basis of the regulation data; and means for transmitting information indicating that the software data was used, through the transmitting system.

To accomplish the above objects, according to still another embodiment of the invention, the above information is preferably an execution time and/or a use style.

To accomplish the above object, according to further another embodiment of the invention, the software data is preferably data compressed on the basis of MPEG or JPEG.

To accomplish the above object, according to still another embodiment of the invention, there is provided a management system of software data in a system which can use, at a terminal, software data that is transmitted from a management center through a predetermined transmission system, wherein the terminal returns a use style of the software data to the management center, and the management center charges in accordance with the returned use style.

To accomplish the above object, according to further another embodiment of the invention, there is provided a terminal apparatus using software data which is transmitted together with use regulation data from a management center through a predetermined transmission system, wherein the terminal apparatus has a control unit for controlling the operation on the basis of a program for regulation so as to allow a command corresponding to the operation that is permitted by the use regulation data to be accepted.

DETAILED DESCRIPTION OF THE PREFERRED EMBODIMENTS

A preferred embodiment according to the invention will now be described hereinbelow every element with reference to the drawings.

Figure 1:
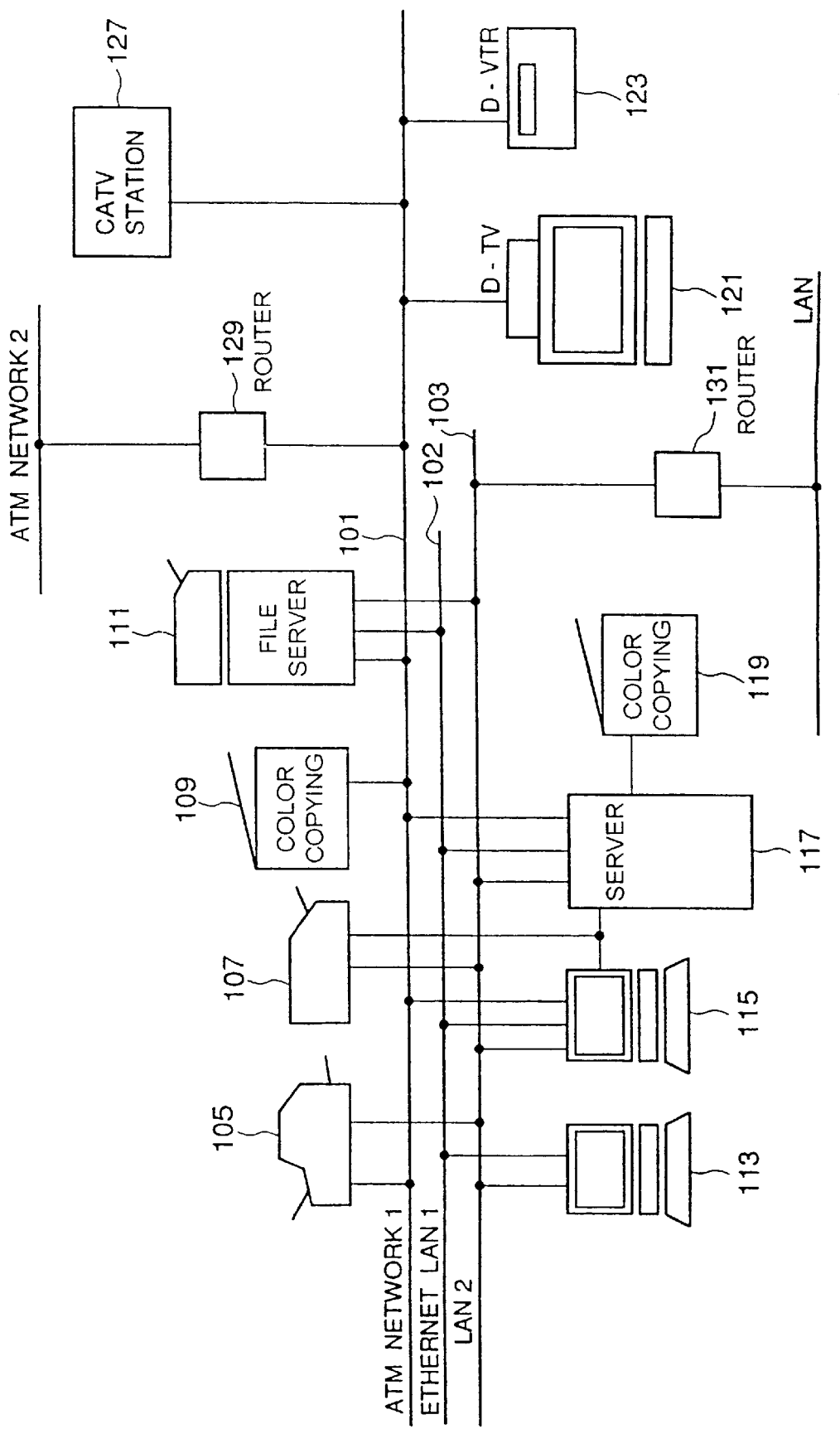
FIG. 1 is a block diagram showing an overall system using one embodiment of the invention.

FIG. 1 is a block diagram showing a whole system of the embodiment.

In FIG. 1, reference numeral 101 denotes an ATM (asynchronous transfer mode) network for transferring various kinds of encoded data such as image data and the like which have been encoded by various systems such as JPEG, MPEG, or the like in the ATM; 103 a local area network (LAN) using an Ethernet or the like for transferring data in a mode other than the ATM; 105 a facsimile apparatus which is connected to the ATM network and has a compressing and expanding function of the image data; and 107 a color printer which has a page memory therein and forms an image on the basis of the image data obtained by expanding received compressive data.

Reference numeral 109 denotes a color copying apparatus including a color reader and a color printer. The color copying apparatus includes: a compressing circuit for compressing image data of an original read by the color reader on the basis of, for example, the JPEG system; a page memory in which the compressed image data is written; and an expanding circuit for reading out the compression image data written in the page memory and for expanding it in order to supply to the printer.

Reference numeral 111 denotes a file server for temporarily storing the image data that is inputted through the ATM network; 113 a workstation for inputting and outputting data to/from the file server; and 115 a personal computer (PC) which is connected to the ATM network. The personal computer 115 transmits and receives the MPEG data or JPEG data to/from the above local area network, executes the encoding and decoding of the data, and performs various processes such as editing and the like of various image data.

The personal computer 115 is connected to the printer 107 and the like through the network line 103 or an exclusive-use line.

Reference numeral 117 denotes a server similar to the file server 111 and which has a construction similar to that of the server 111.

A color copying apparatus 119 similar to the foregoing color copying apparatus 109 is connected to the server 117.

Reference numeral 121 denotes a digital television connected to the ATM network. The digital television receives encoded data of the MPEG or JPEG system which is inputted through the ATM network and decodes it and displays the decoded data as a visible image a CRT display apparatus.

A display apparatus using a ferroelectric liquid crystal called an FLC can be also used as such a display monitor.

Reference numeral 123 denotes a VTR for receiving the compression image data of the MPEG or JPEG system inputted through the ATM network.

The VTR 123 records the MPEG or JPEG compression image data inputted from the ATM network line as compressed encoding data or executes a predetermined signal process to such compression image data and, after that, records the processed data onto a tape.

The VTR 123 also has an image data compression unit for compressing the non-compression data received from the outside on the basis of the MPEG or JPEG system and for recording the compressed data onto the tape.

Reference numeral 127 denotes a CATV station for transmitting various kinds of software data compressed by the MPEG or JPEG compression image data system and data for broadcasting to the ATM network. The CATV station 127 executes various kinds of managements such as management of the uses of various software which is transmitted, management of compensation therefor, and the like.

The CATV station 127 stocks the software data registered with various software protecting organizations. A management number of each body of software data, regulation data of a use style, and charging data are allocated to each of the bodies of registered software data.

The regulation data of the use style denotes various data to regulate a style in which the software is employed by the user. Namely, the regulation data includes: data indicating whether copying of the software is permitted or inhibited; data indicating whether partial copying or renewal or editing is permitted or inhibited; the number of copies which may be performed in one operation; data indicating whether the transfer to another terminal apparatus is permitted or inhibited; and the like. Ordinarily, such regulation data has been stored in a header. For example, in case of JPEG data, the regulation data is stored in a frame header. In the case of an ATM cell using an ATM communication, the regulation data is stored in a packet header. In the case of the MPEG data, the regulation data is stored in each of an I frame, a B frame, a P frame, and the like of a GOP layer.

The charging data includes: data indicative of the number of software use times for every user; data regarding the use date and time; data indicative of the presence or absence of renewal or editing; and the like. The CATV station transmits such charging data and regulation data to each user together with the requested software periodically or in accordance with a request from the user.

Further, the regulation data regulates an effective time when the above software data is loaded into the memory in the terminal. After the lapse of such effective time, the terminal automatically erases the software from in the memory.

Reference numeral 129 denotes a router to connect the ATM network to another ATM network.

Reference numeral 131 denotes a router for connecting with another local area network.

An ATM network switch (not shown) is provided between the facsimile apparatus 105, printer 107, and color copying apparatus 111 and the ATM network.

The kind of each terminal and the terminal number in the embodiment have previously been registered in the CATV station 127. Thus, the CATV station 127 grasps the use situation and the like of each terminal and can execute the management of the compensations for the user of each terminal and the management for payment of the compensation to the creator of the software.

The JPEG data among various kinds of data which are transmitted by the network will now be described.

Figure 2:
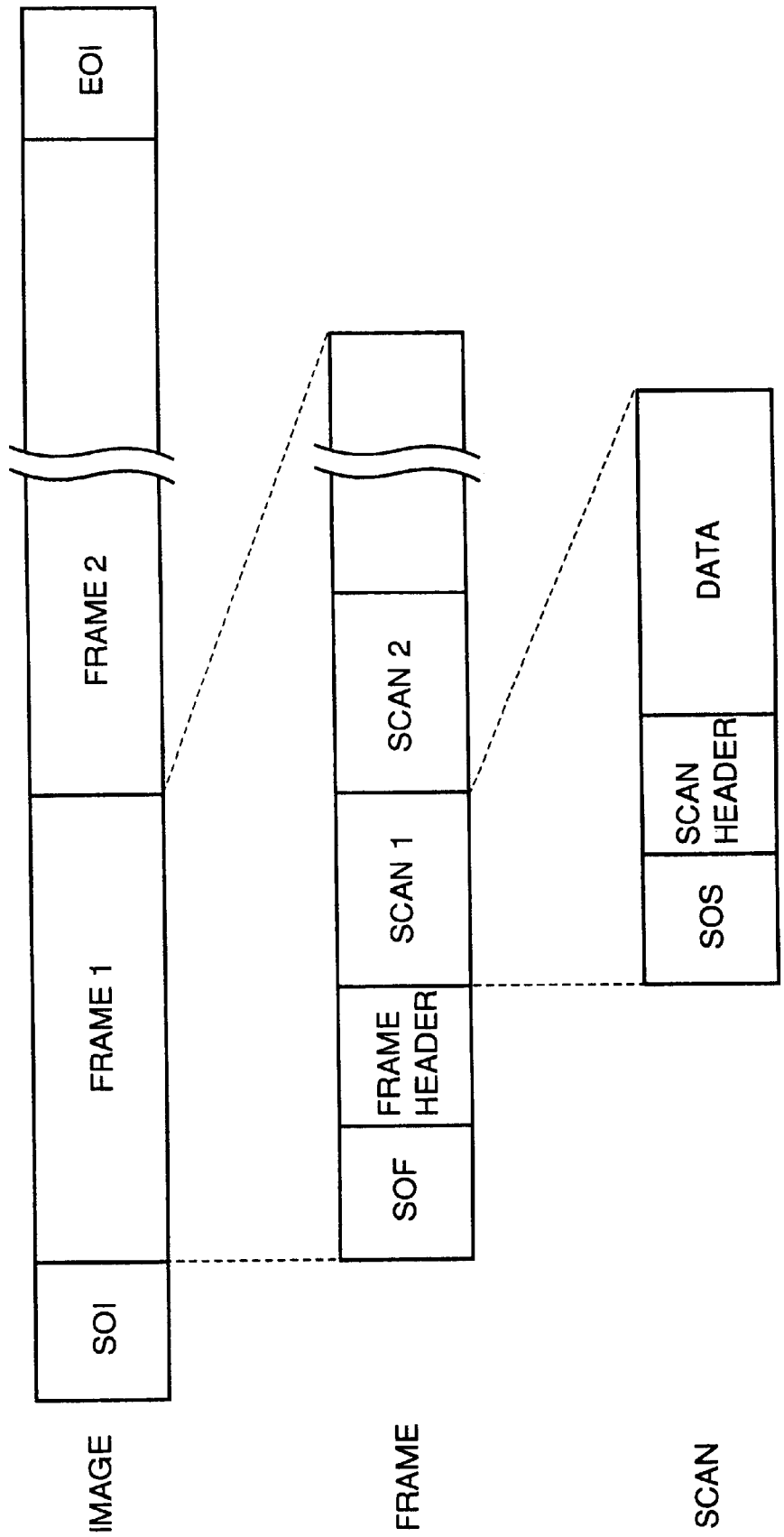
FIG. 2 is a constructional diagram of JPEG data.

The JPEG data is data encoded on the basis of the JPEG system of CCITT/ISO as an international standard format having an object to compress a color still image by using frequency characteristics of data and human visual sense characteristics. In the JPEG data, the encoding data and various marker codes are constructed as a hierarchical structure of image/frame/scan as shown in FIG. 2.

Namely, the JPEG code is constructed by an SOI (Start Of Image) code, a frame, and an EOI (End Of Image) code. In case of data which was hierarchically encoded, the above frame is constructed by a plurality of frames at every hierarchical level. In the case where the data is not hierarchically encoded, the frame is constructed by a single frame.

The frame is constructed by an SOF (Start Of Frame) code, a frame header, and a scan. The scan is constructed by an SOS (Start Of Scan) code, a scan header, and the encoded data.

In the case of divisionally encoding luminance data (Y) and two color difference data (Cr, Cb) (in case of non-interleaving), the scan is constructed by a plurality of scans. In the case of encoding without dividing each data (in the case of interleaving), the scan is constructed by a single scan.

An encoding/decoding algorithm in the fundamental base line system in the JPEG system as mentioned above will now be described with reference to FIGS. 3 and 4.

First, the input image data is divided into blocks of (8 pixels)×(8 pixels) by a block forming circuit 201. The block is two-dimensional DCT (Discrete Cosine Transformation) processed by a DCT circuit 202, thereby converting it into horizontal and vertical space frequency components (DCT coefficients) comprising one kind of DC component (DC) and 63 kinds of AC components (AC).

Each frequency component obtained as mentioned above is divided by a predetermined coefficient (quantization coefficient) by a quantizer 203 and is thus quantized. After that, the quantized component is encoded by means of known algorithms which are different for the DC component and the AC component, respectively.

As such a quantization coefficient, a different coefficient is generally used for every frequency component. The quantization coefficient for a low frequency component that is visually important is set to be smaller than the quantization coefficient for a high frequency component.

Thus, the high frequency component that is not relatively important is cut and the whole data amount is reduced.

With respect to the DC component, by using the fact that its correlation with the adjacent block is high, a difference between the DC components of the present block and the preceding block is obtained by a difference circuit 204. The obtained difference value is one-dimensional Huffman encoded by a Huffman encoder 205, thereby obtaining encoded data of the DC component.

With respect to the AC components, the 63 kinds of AC components are sequentially zigzag scanned by a scanning circuit 206 from the frequency component on the low frequency side that is visually important and are converted to a one-dimensional array. A discrimination circuit 207 judges whether the value of each component is equal to "0 value" or another value (valid coefficient).

With respect to the "0 value", a 0 run is counted by a counter 208. The valid coefficients are grouped by a grouping circuit 209 in accordance with their values. A two-dimensional Huffman encoding is performed by a Huffman encoder 210 in accordance with a combination between the run lengths and the group values obtained by the above counting and grouping processes, thereby obtaining encoding data of the AC components.

According to the Huffman code, the whole data amount is reduced by allocating a shorter code length to codes of a high incidence probability (with respect to the DC component, the foregoing difference value; with regard to the AC components, the combination of the run length and the valid coefficient).

With regard to the code of a low incidence probability, by combining with a predetermined code (ZRL code), all of the patterns can be expressed by a limited number of codes.

In the JPEG, the above processes are executed on a block unit basis, thereby finishing the encoding of one color still image.

Figure 3:
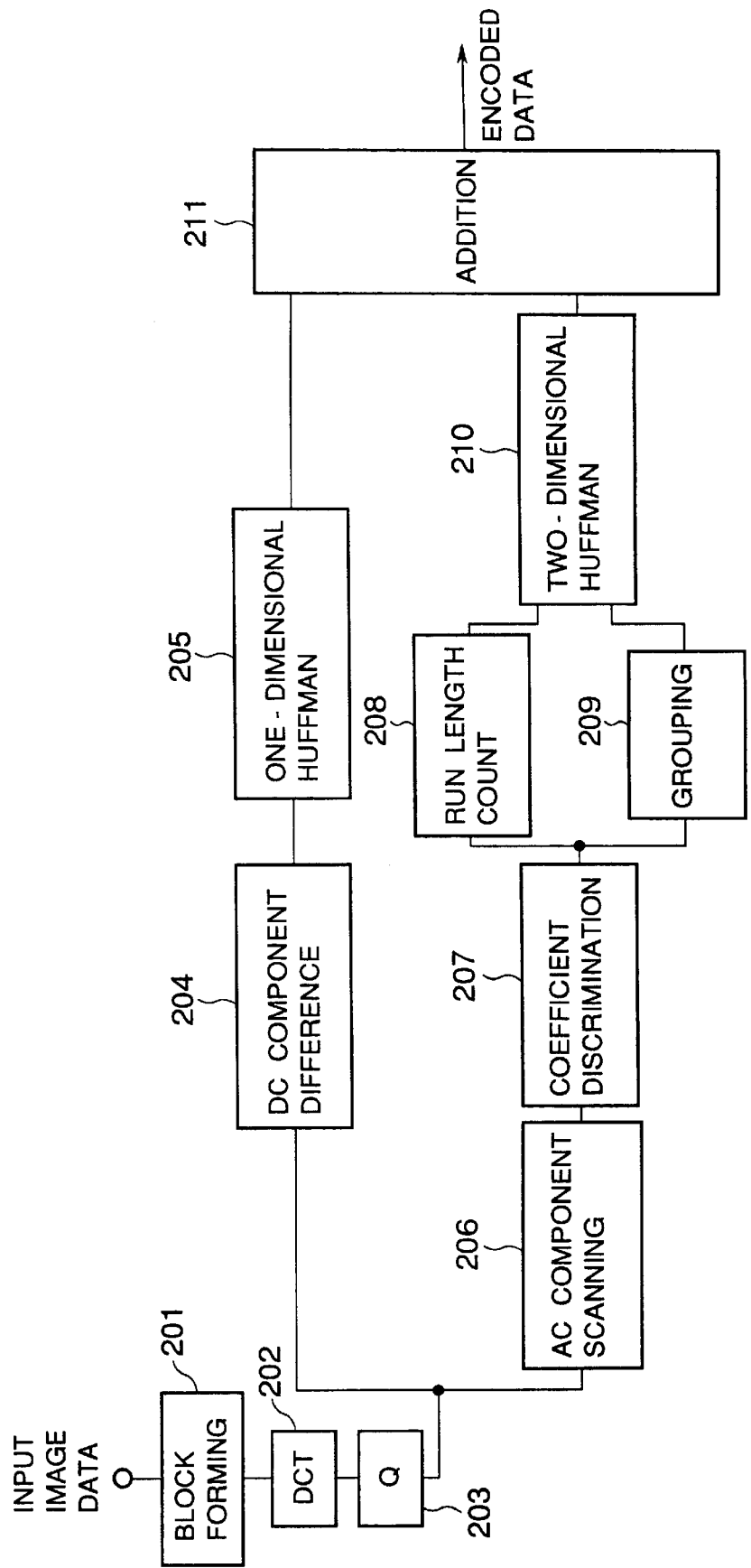
FIG. 3 is a diagram showing an algorithm for encoding in a fundamental base line system in a JPEG system.
Figure 4:
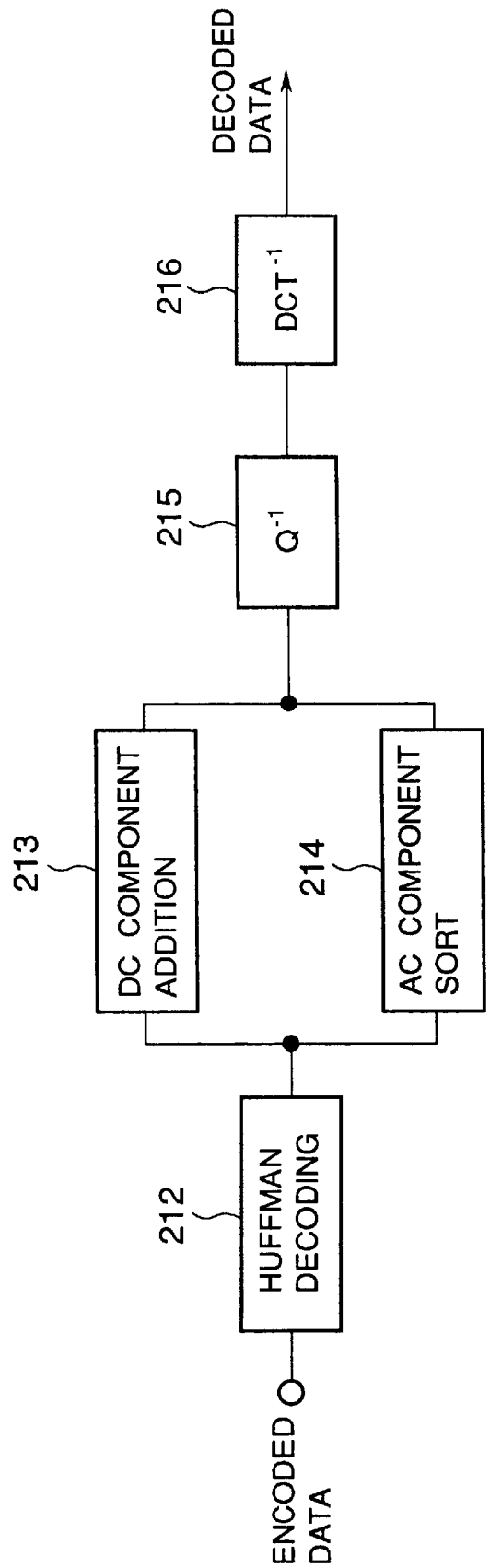
FIG. 4 is a diagram showing an algorithm for decoding in the fundamental base line system in the JPEG system.

After that, the foregoing marker code or the like is added to each of the encoding data by an addition circuit 211, thereby obtaining JPEG data shown in FIG. 3.

Since the above quantization coefficient and Huffman code can be arbitrarily set, the quantization coefficient used for encoding and the data indicative of the Huffman code are added after the SOI code.

An algorithm for decoding will now be described.

The decoding algorithm is fundamentally opposite to the encoding algorithm. The input encoding data is decoded by a decoding unit 212 by using a Huffman table sent together with the encoding data. The DC component is added to the DC component of the preceding block by an addition unit 213, thereby obtaining the original DC component. With respect to the AC components, decoded frequency components are converted to an original two-dimensional array by a sorting circuit 214.

After that, those frequency components are inversely quantized by an inverse quantizer 215 and are subsequently inversely discrete cosine transformed by an inverse DCT circuit 216, so that they are converted to original image data (decoding data).

In the JPEG, the above processes are executed on a block unit basis, thereby finishing the decoding of one color still image.

Although the above decoding algorithm is a fundamental algorithm of the JPEG system, an extended system obtained by further adding various kinds of hierarchical encoding processes to the above algorithm is admitted as a JPEG system. In the case of executing such a hierarchical encoding process, the kind of such a hierarchical encoding is expressed by the SOF code.

The MPEG data in various data that is transmitted by the above network will now be described.

The MPEG data conforms with the international standard having as an object to encode a moving image with high efficiency. Fundamentally, although the frequency characteristics of the data and the human visual sense characteristics are used in a manner similar to the foregoing JPEG system, the MPEG data is based on the system in which a more highly efficient encoding is performed by further using a redundancy in the time base direction that is peculiar to the moving image.

The MPEG system has: an MPEG1 in which a transfer rate is set to the maximum value of 1.5 Mbps for a digital storage media; and an MPEG2 in which an upper limit of a transmission rate is eliminated and it is intended that the system is used in all of the transmitting systems such as bidirectional digital multimedia equipment, digital VTR, ATV, optical fiber network, and the like. However, since their fundamental algorithms are almost the same, the MPEG1 is used as a base and its data structure and encoding/decoding algorithm will now be described.

In the MPEG2, although a usable encoding method is specified by a plurality of profiles (simple profile, main profile, scalable, space scalable, high), a typical main profile is fundamentally almost equal to the MPEG1.

The principle of the highly efficient encoding system of the MPEG will now be described.

In that highly efficient encoding system, by obtaining a difference between the frames, a redundancy in the time base direction is eliminated the differential data thus obtained is DCT converted and variable length encoded, and a redundancy in the space direction is eliminated, thereby realizing a highly efficient encoding as a whole.

With respect to the redundancy in the time base direction, in case of a moving image, by paying attention to point that a correlation between the continuous frames is high, a difference between the target frame to be encoded and the frame that is preceding or subsequent with regard to the time is obtained, thereby enabling the redundancy to be eliminated.

Figure 5:
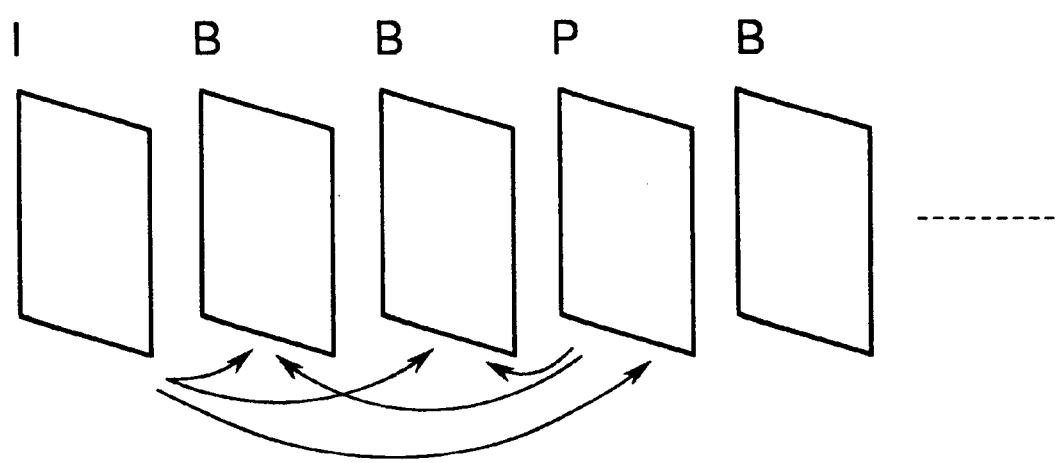
FIG. 5 is a diagram for explaining the principle of the encoding by an MPEG system.

In the MPEG, therefore, in addition to an intra-encoding image (I-picture) which is obtained in the encoding mode to mainly encode in the frame, as shown in FIG. 5, there are: a forward prediction encoding image (P-picture) for encoding a difference value between the target frame to be encoded and the frame that is preceding with respect to the time; and a two-direction prediction encoding image (B-picture) for encoding a difference value of the smallest data amount in a difference value between the target frame and the frame that is preceding or subsequent with respect to the time and a difference value between the target frame and the frame interpolated from both of the preceding and subsequent frames. Those frames according to those encoding modes are combined in accordance with a predetermined order.

In the MPEG, one unit (GOP) is constructed by one I-picture, four P-pictures, and ten B-pictures. A combination such that the I-picture is arranged at the head and two B-pictures and two P-pictures are repetitively arranged is recommended. By placing the I-pictures at a predetermined period, a special reproduction such as a reverse reproduction or a partial reproduction on a GOP unit basis can be performed, thereby preventing error propagation.

When a new object appears in the frame, there is a case where by obtaining the difference between the target frame and the frame that is subsequent with respect to the time rather than by obtaining the difference between the target frame and the frame that is preceding with regard to the time, the difference value decreases.

In the MPEG, therefore, by executing the two-direction prediction encoding as mentioned above, a more efficient compression is performed.

In the MPEG, motion compensation is also performed.

Namely, as for the foregoing blocks each comprising (8 pixels×8 pixels), a predetermined block (macroblock) unit is constructed by collecting four blocks with respect to the luminance data and two blocks with regard to the color difference data. A difference with the macroblock near the corresponding block of the preceding or subsequent frame is obtained. By searching out the macroblock of the smallest difference, a motion vector is detected. The motion vector is encoded as data.

When decoding, the corresponding macroblock data of the preceding or subsequent frame is extracted by using the motion vector, thereby decoding the encoded data which was encoded by using a motion compensation.

In such a motion compensation as mentioned above, after the frame that is preceding with respect to the time was once encoded, it is again decoded, thereby obtaining a frame. Such a frame is set to the preceding frame. The motion compensation is performed by using the macroblock in such a preceding frame and the macroblock of the target frame to be encoded.

Although the inter-frame motion compensation is performed in the MPEG1, an inter-field motion compensation is executed in the MPEG2.

The differential data and motion vector obtained by the motion compensation as mentioned above are still more efficiently encoded by the DCT conversion and Huffman encoding as already described above.

A data structure of the MPEG system will now be described.

Figure 6:
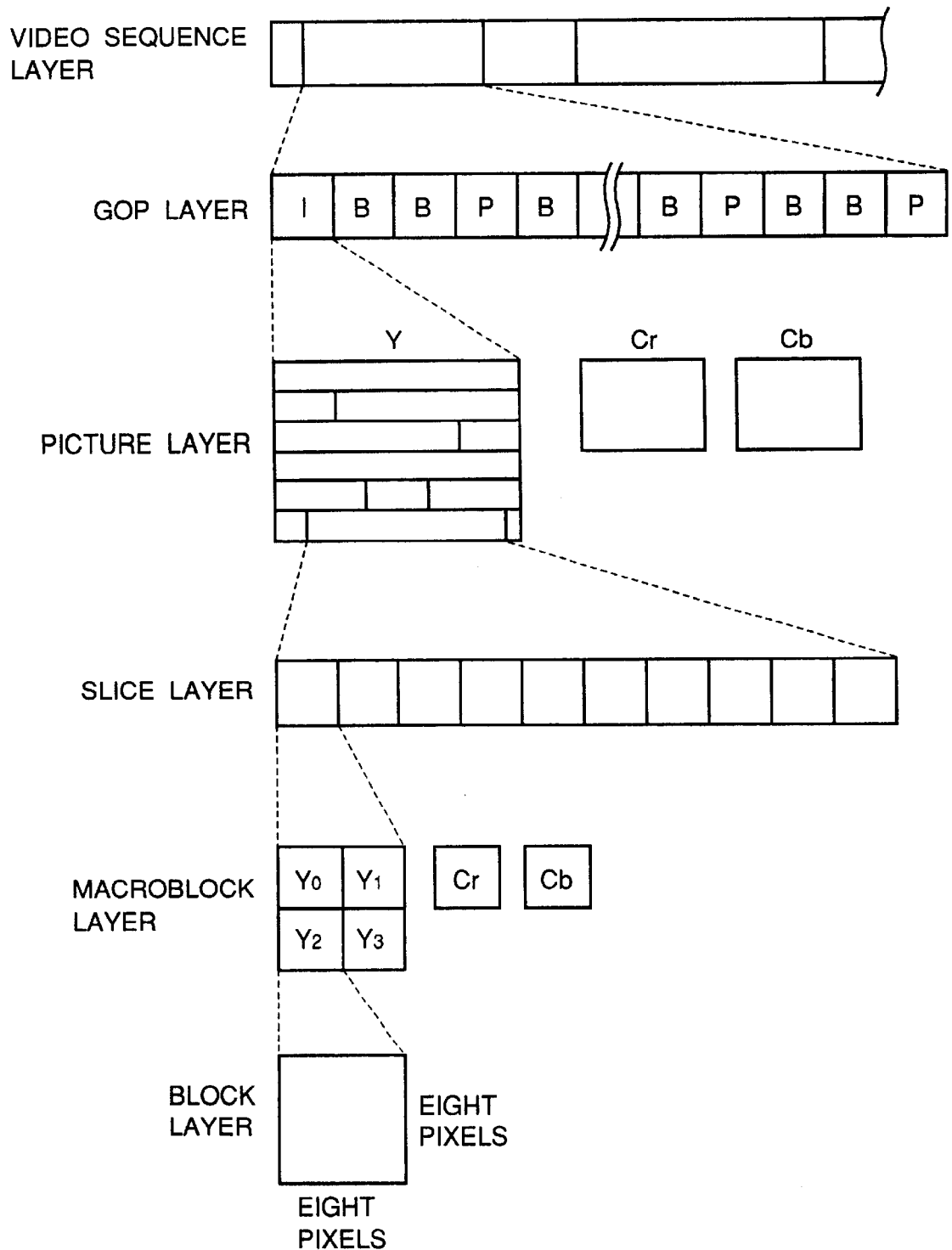
FIG. 6 is a diagram showing an MPEG data structure.

As shown in FIG. 6, the data structure is constructed by a hierarchical structure comprising a video sequence layer, a GOP layer, a picture layer, a slice layer, a macroblock layer, and a block layer.

Each layer will now be sequentially described hereinbelow from the lowest layer in the diagram.

First, the block layer is constructed by (eight pixels×eight pixels) of luminance data and color difference data in a manner similar to the foregoing JPEG. The DCT is executed on this unit basis.

The macroblock layer is constructed by collecting four blocks with respect to the luminance data and one block with respect to each of the color difference data as for the foregoing blocks each comprising (8 pixels×8 pixels) and by adding a macroblock header. In the MPEG system, the macroblock is set to a unit for motion compensation and encoding which will be explained hereinlater.

The macroblock header includes: each data of the motion compensation of each macroblock unit and quantization steps; and data indicating whether six DCT blocks (Y0, Y1, Y2, Y3, Cr, Cb) in each macroblock have data or not.

The slice layer is constructed by one or more macroblocks which are continuous in accordance with the scanning order of the image and a slice header. The quantization steps in a series of macroblocks in the same slice layer can be set to constant steps.

The slice header has data regarding the quantization steps in each slice layer. When the peculiar quantization step data doesn't exist in each macroblock, the quantization steps in the slice layer are set to constant steps.

In the first macroblock, the difference value of the DC component is reset.

The picture layer is formed by collecting a plurality of slice layers on a frame unit basis and is constructed by a header comprising a picture start code and the like and one or a plurality of slice layers subsequent to the header.

The header includes a code indicative of an encoding mode of the image and a code indicative of a precision of the motion detection (pixel unit or half-pixel unit).

The GOP layer is constructed by: a header such as group start code, time code indicative of the time from the beginning of a sequence, and the like; and a plurality of I frame, B frames, or P frames subsequent to the header.

The video sequence layer starts from a sequence start code and ends at a sequence end code. Control data such as image size, aspect ratio, and the like which are necessary for decoding and a plurality of GOPs in which the image size and the like are equal are arranged between the sequence start code and the sequence end code.

In the MPEG system having such a data structure, a bit stream is specified by its standard.

Fundamental encoding apparatus and decoding apparatus which handle the MPEG data as mentioned above will now be described with reference to FIGS. 7 and 8.

Figure 7:
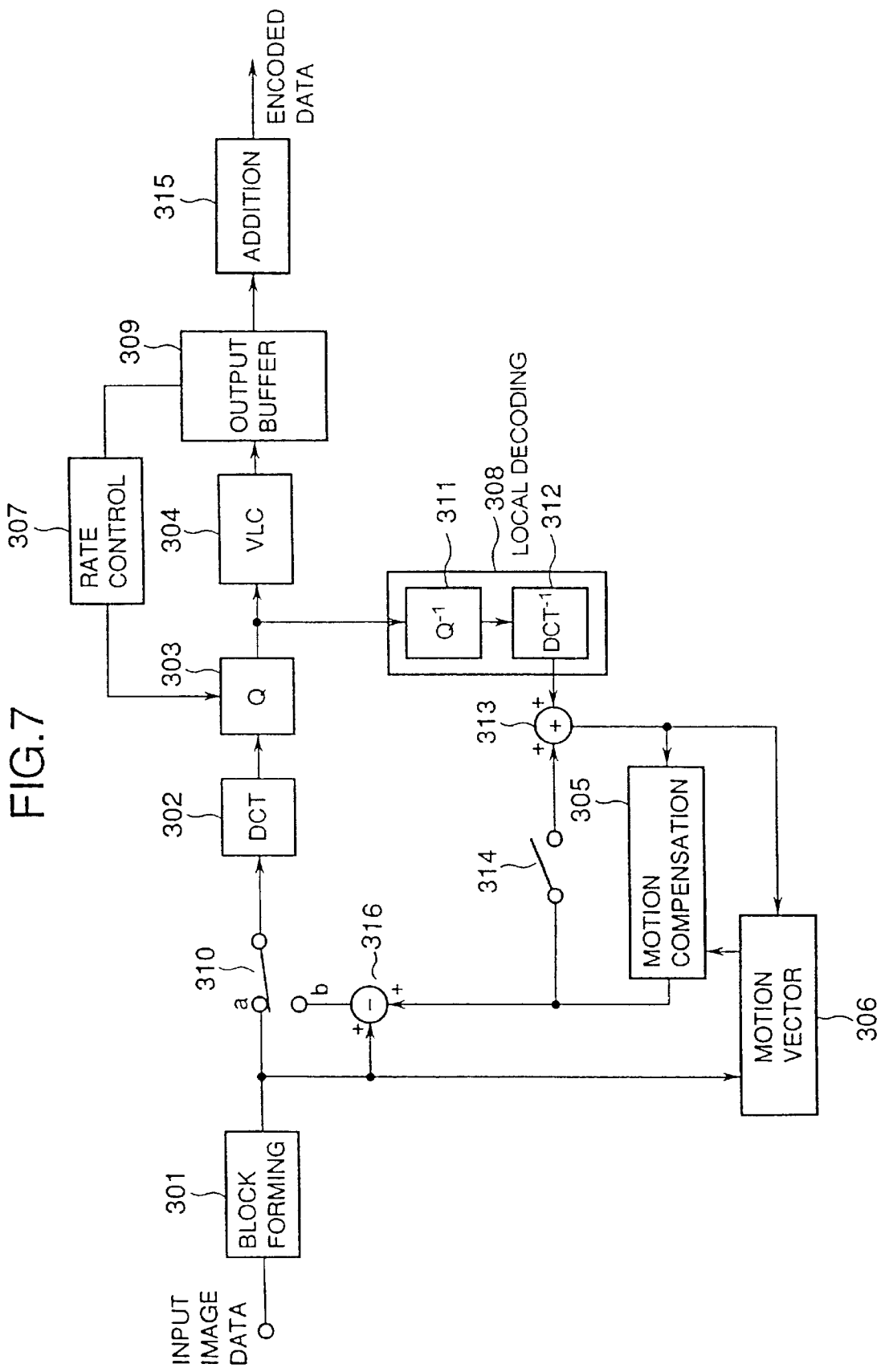
FIG. 7 is a schematic diagram of a fundamental encoding apparatus for handling MPEG data.
Figure 8:
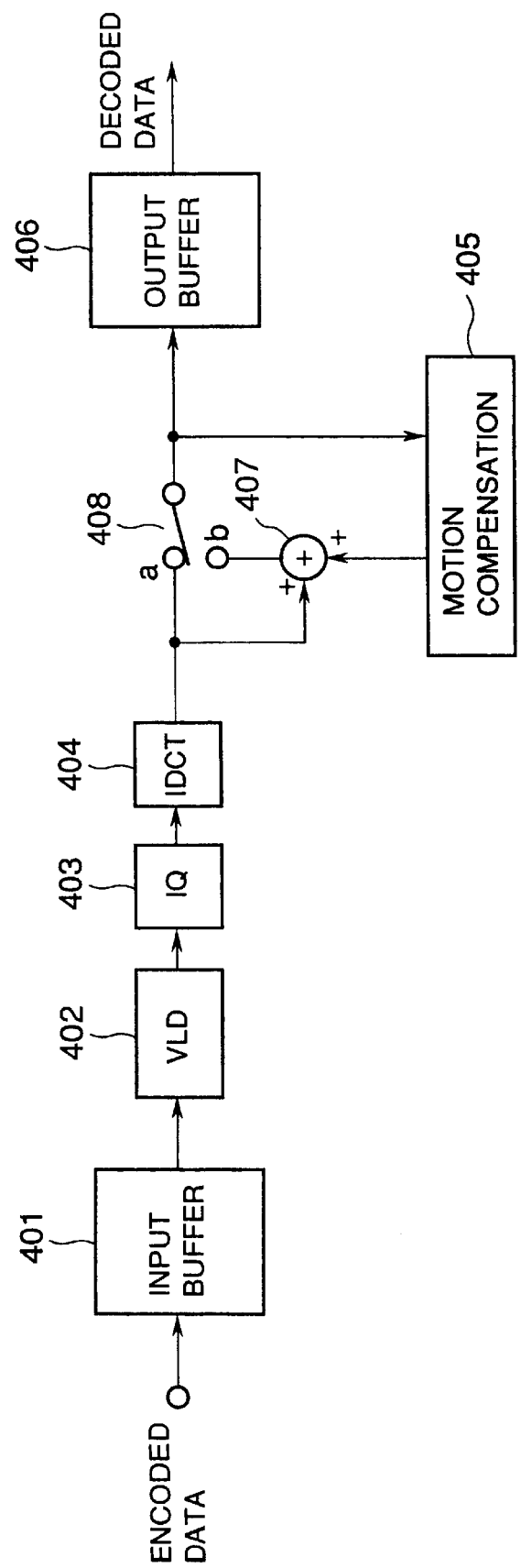
FIG. 8 is a schematic diagram of a fundamental decoding apparatus for handling the MPEG data.

As shown in FIG. 7, the encoding apparatus is schematically constructed by: a block forming circuit 301; a DCT circuit 302; a quantizer 303; a variable length coder (VLC) 304; a motion compensation circuit 305; a motion vector detector 306; a rate control circuit 307; a local decoding unit 308; an output buffer 309; and the like.

Figure 9:
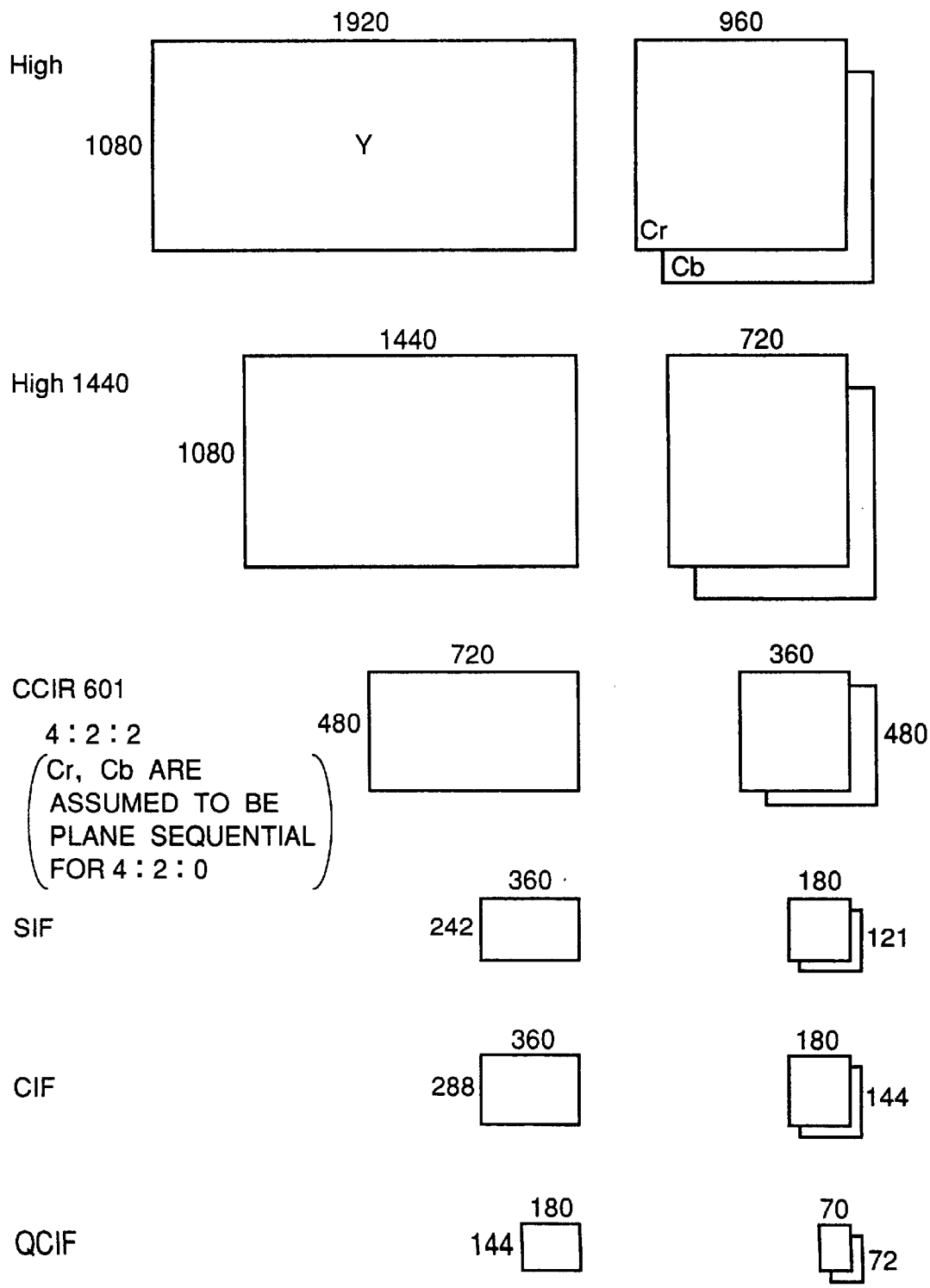
FIG. 9 is a diagram showing an image size as a target for encoding.

As shown in FIG. 9, as image sizes as targets for the encoding in the encoding apparatus, there are: a size corresponding to High of (1920 pixels×1080 pixels) [corresponding to the high level in the MPEG2]; a size corresponding to High 1440 of (1440 pixels×1080 pixels) [corresponding to the high 1440 level in the MPEG2); a size corresponding to the image corresponding to the CCIR.601 of (4:2:2) or (4:2:0) [corresponding to the main level in the MPEG2]; and a size corresponding to the SIF, CIF, or QCIF format. At the low level in the MPEG1 and MPEG2, the image size of the SIF format is used as a target.

In the encoding apparatus, the image data to be encoded is divided into the foregoing blocks each consisting of (8 pixels×8 pixels) by the block forming circuit 301 and is transmitted to the DCT circuit 302 through a switch 310.

The switch 310 is switched in dependence on whether the input image data relates to the intra-frame (I frame) or another frame (P frame or B frame). In case of the intra-frame, the switch 310 is connected to an (a) contact. In the other cases, the switch 310 is connected to a (b) contact.

In case of the intra-frame, the input image data is DCT converted by the DCT circuit 302, so that the derived DCT coefficients are quantized by the quantizer 303 and are further encoded by the variable length coder 304. After that, the coded data is once stored into the buffer 309.

In the case other than the intra-frame, the switch 310 is connected to the contact (b) and the motion compensation described before is executed.

That is, reference numerals 311 and 312 denote an inverse quantizer and an inverse DCT circuit constructing the local decoding unit 308. The data quantized by the quantizer 303 is returned to the original data by the local decoding unit 308.

Reference numeral 313 denotes an addition unit; 314 a switch which is closed only in the cases other than the intra-frame; and 316 a subtraction unit. As for the image data which was locally decoded as mentioned above, the corresponding macroblock in a predetermined frame (preceding frame, subsequent frame, or frame interpolated by them) with reference to the motion vector detected by the motion vector detector 306 is outputted.

An output of the motion compensation circuit 305 is inputted to the subtraction unit 316, by which a subtraction between such output and the input image data is performed, so that a difference value is obtained. The difference value is transmitted through the DCT circuit 302 and quantizer 303 and is encoded by the variable length coder (Huffman encoder) 304 and is stored into the buffer 309.

Although the Huffman encoder is fundamentally similar to the encoder in the JPEG described before, it differs with respect to a point that a predetermined code (escape code) is unconditionally allocated to the code of a low incidence probability.

The motion vector detector 306 obtains a motion vector by comparing the frame data to be encoded from now on and predetermined reference frame data. A detection output of the detector 306 is supplied to the motion compensation circuit 305, thereby designating the macroblock to be outputted by the motion compensation circuit 305.

The rate control circuit 307 controls a code amount by switching the quantization steps in the quantizer 303 on the basis of an occupation amount of the encoding data in the buffer.

Lastly, various headers as shown before are added to the encoding data by the addition circuit 315 and the resultant data is transmitted as MPEG data corresponding to the MPEG system.

On the other hand, the decoding apparatus fundamentally executes the operation opposite to the foregoing encoding. As shown in FIG. 8, the decoding apparatus is constructed by: an input buffer 401; a variable length decoder (VLD) 402; an inverse quantizer (IQ) 403; an inverse DCT circuit (IDCT) 404; a motion compensation circuit 405; an output buffer 406; and the like.

That is, the encoding data which is sequentially read out from the input buffer 401 is processed by the variable length decoder 402, inverse quantizer 403, and inverse DCT circuit 404 and is converted to the data in the space area.

Reference numeral 407 denotes an addition unit for adding a difference value from the motion compensation circuit 405 to an output of the inverse DCT circuit 404. Reference numeral 408 denotes a switch to select the output of the inverse DCT circuit 404 or an output of the addition unit 407.

The switch 408 is connected to a contact (a) in case of the intra-frame and to a contact (b) in the cases other than the intra-frame on the basis of an encoding ID code detected by a data detecting circuit (not shown).

The decoded data which was decoded as described above is once stored into the output buffer 406 and is further reconstructed at an original space position and is outputted as image data of one frame.

An ATM communication format will now be described.

Figure 10:
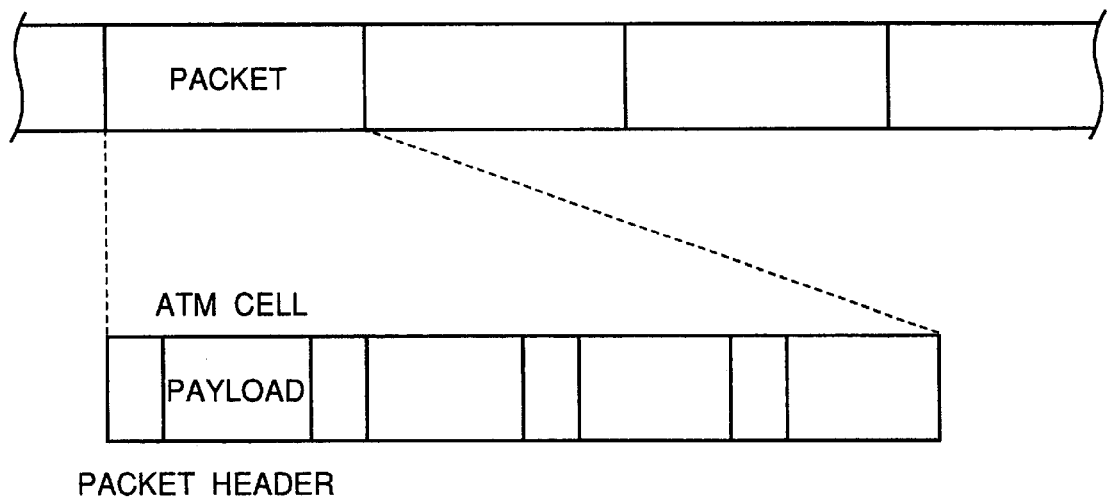
FIG. 10 is a diagram showing an ATM communication format.

In the ATM communication, as shown in FIG. 10, a series of bit streams are divided into a plurality of fixed length packets. Each packet is constructed by a plurality of (for example, four) ATM cells.

Each ATM cell is constructed by a packet header and a payload for data. Generally, the header consists of five bytes and the data consists of 48 bytes.

In the embodiment, the regulation data of the use style and charge data mentioned above are arranged in the packet header.

In the ATM communication, the data can be transmitted independent of (asynchronously with) a bit rate of the network and the transmission rate can be arbitrarily set on the basis of the number of transmission cells per unit time. Therefore, the ATM communication is suitable for the transmitting system for mixedly transmitting various data.

A construction of the personal computer in FIG. 1 will now be described.

Figure 11:
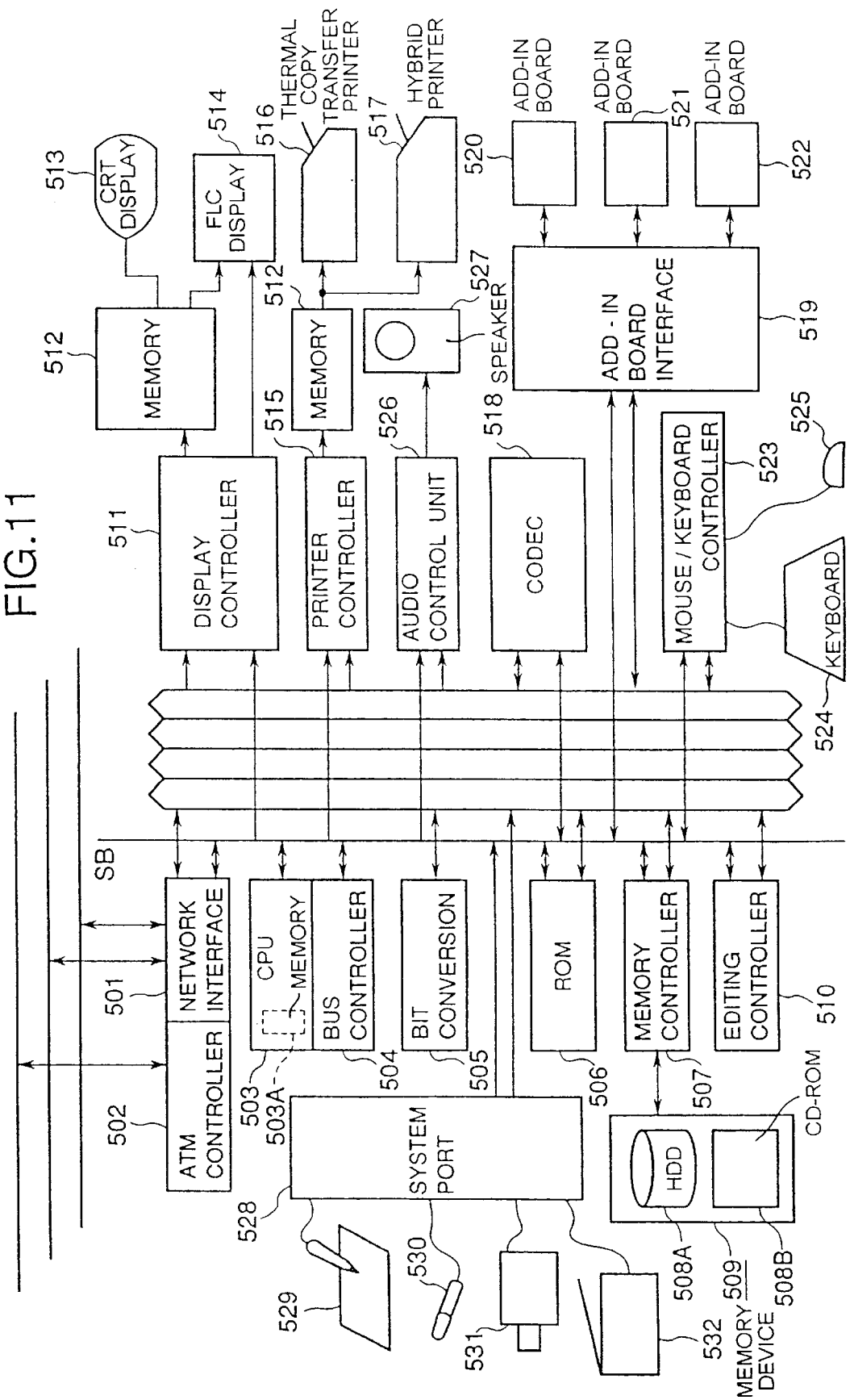
FIG. 11 is a diagram showing a construction of a personal computer of the invention.

FIG. 11 shows a construction of the personal computer in the embodiment. In order to handle the data corresponding to various systems as mentioned above and to have various functions, the personal computer has a multibus system for selectively using an optimum data bus in accordance with a data amount of data to be transmitted and a transfer speed that is required for processes. In the embodiment, the personal computer has: a 16-bit data bus D1; a 32-bit data bus D2; a 64-bit data bus D3; a 128-bit data bus D4 as an expansion bus; and a system bus SB.

The personal computer has an add-in board interface, which will be explained below, for enabling functions to be added. Extra functions can be added by various kinds of add-in boards which are connected to this interface.

Explanation will now be made in detail hereinbelow.

Reference numeral 501 denotes a network interface. Various data are transmitted and received to/from each of the above transmission channels through the network interface 501 and an ATM controller 502 built in the interface 501.

The ATM controller 502 executes not only the function as an ATM switch but also various communication controls such as a vergence control in the foregoing ATM-LAN and the like. The regulation data in the software data transmitted is detected and transmitted to a CPU 503, which will be explained hereinafter.

The CPU 503 regulates various operations of the personal computer on the basis of the regulation data and automatically counts the use time of the software used, the number of using times, and the like by using counters (not shown) and transmits count values to the CATV station 127 through the interface 501. As a construction of the CPU 503 in the embodiment, the CPU executes the returning operation of the use data and the regulating operation as mentioned above on the basis of a program for regulation stored in a memory 503A.

The above regulation program in the memory 503A can be rewritten only by inputting a predetermined password through a keyboard 524 or the like, which will be explained hereinlater. The regulation program in the memory 503A is simply set to a reading state for a period of time during which the personal computer is operating.

The regulation program in the embodiment has a function for judging whether the transmission from the CATV station has preferably been performed or not on the basis of an error rate of an error correcting operation which is obtained in the decoding step in a codec, which will be explained hereinlater. When the error rate is equal to or larger than a predetermined value, namely, when the desired software of the user is not preferably transmitted, the regulation program instructs to return transmission defective data to the CATV station and to remove it from the target for charging.

The regulation program is activated at a highest priority by a communication with the CATV station. So long as the regulation program is not activated, the operation of the personal computer is regulated so that the software is not read out from the CATV station.

The multibus system properly divisionally uses any one of the foregoing data buses in accordance with a capacity of data to be processed and a processing speed, thereby enabling a necessary processing speed to be realized.

Reference numeral 506 denotes an ROM and 507 indicates a memory controller. Data is transmitted and received to/from an external memory device 509 having a hard disk device 508A, a CD-ROM 508B, and the like by the memory controller 507.

By receiving an instruction from the CPU 503, the memory controller 507 automatically deletes the software data after the elapse of an effective time of the software data based on the regulation data. After completion of the deletion, the CPU 503 returns a notice of completion of deletion to the CATV station. Thus, the CATV station can confirm the presence or absence of the software data at each terminal.

Reference numeral 510 denotes an editing controller. A phase management of the data and the like at an image editing time and the like are executed by the editing controller 510.

Reference numeral 511 denotes a display controller. The image data which is transmitted from the display controller 511 is displayed onto a CRT display 513 or an FLC display 514 through a memory 512.

The display controller 512 properly executes processes in accordance with the kind of display device.

Reference numeral 515 denotes a printer controller. The printer controller 515 selectively uses a thermal copy transfer printer 516 or a hybrid printer 517 having different printer units such as BJ type, thermal copy transfer type, and the like in accordance with image data to be printed.

The memory 512 can be also commonly used for the display and for the printer.

Reference numeral 518 denotes a codec for encoding/decoding the data. In the embodiment, the personal computer has a codec corresponding to the JPEG system and MPEG system as already described before.

Reference numeral 519 denotes an add-in board interface as mentioned above. The function of the personal computer can be expanded by connecting various add-in boards 520, 521, and 522 through the interface 519.

Reference numeral 523 denotes a mouse/keyboard controller. A keyboard 524 and a mouse 525 are connected through the controller 523.

Reference numeral 526 denotes an audio control unit and 527 indicates an audio speaker.

On the other hand, a hand-writing input device 529, an audio microphone 530, a video camera 531, and a scanner 532 are connected to the personal computer through a system port 528.

Since the personal computer with such a construction has a multibus system comprising the multidata buses D1, D2, D3, and D4, bus controller 504, and bit conversion unit 505 as mentioned above, the optimum data bus is selectively used in accordance with the data amount and the transfer speed, processing speed, and the like which are required for the necessary processes.

The level of functioning can be expanded by the add-in board which is connected to the add-in board interface 519. For example, as an add-in board of the codec, by connecting a board for performing the encoding and decoding corresponding to each of the above profiles, those processes can be expansively executed.

A construction of the codec in the personal computer in FIG. 11 will now be described.

Figure 12:
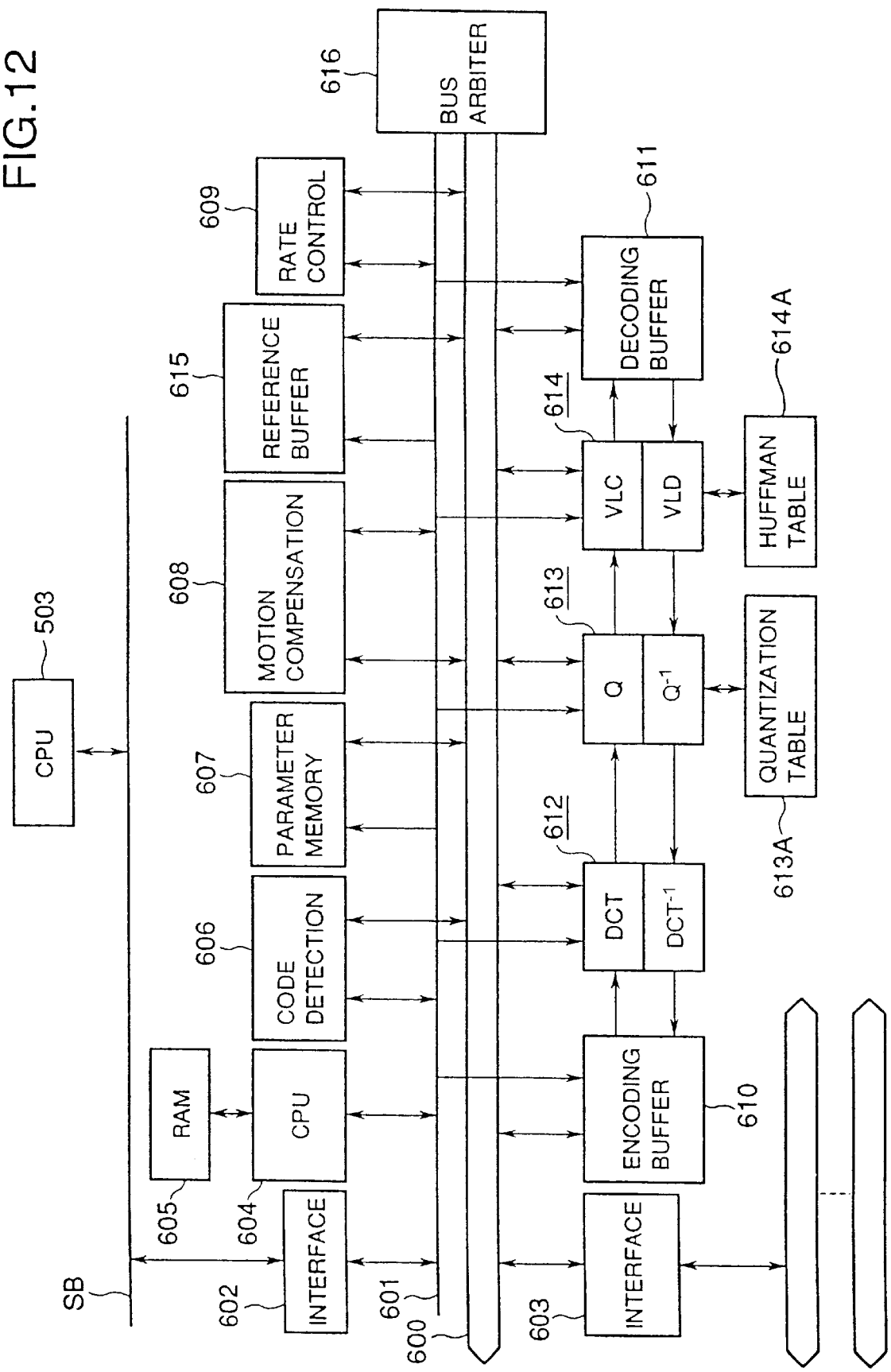
FIG. 12 is a diagram showing a construction of a codec in the personal computer.
Figure 13:
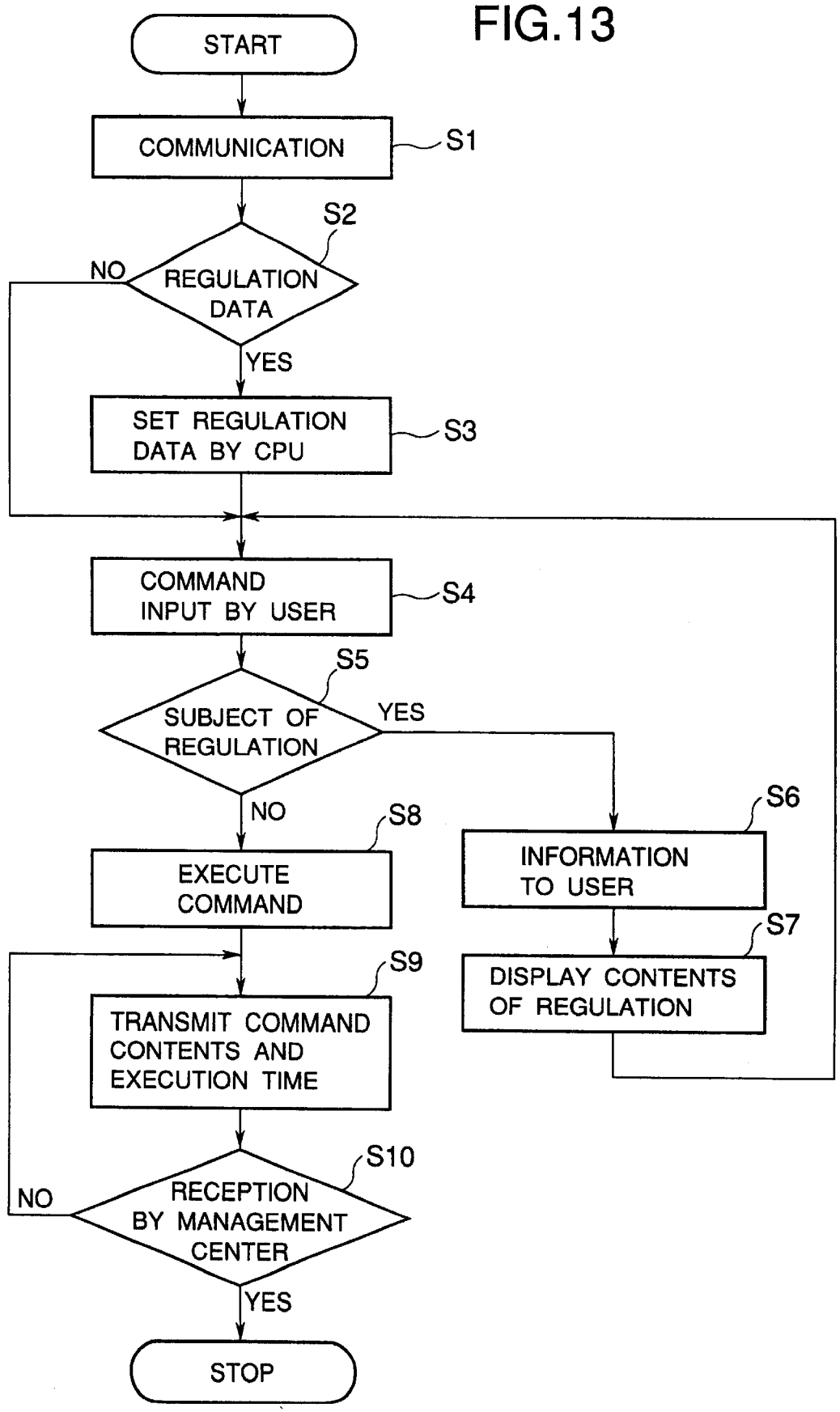
FIG. 13 is a flowchart showing the regulating operation.

As shown in FIG. 12, the codec is constructed by various functional blocks connected to a data bus 600 and a system bus 601 and transmits and receives data to/from the system bus SB of the personal computer main body and each data bus through a microcomputer interface 602 and a data interface 603.

In the diagram, reference numeral 604 denotes a CPU to control the whole operation of the codec. The CPU 604 allows the encoding and decoding processes to be performed on the basis of a program which has previously been stored in an RAM 605.

Reference numeral 606 denotes a code detection unit for detecting a start code (time code) in input encoding data, control codes such as various headers and the like, and encoding data.

Each code detected by the code detector 606 is transmitted to the CPU 604 through the data bus or system bus, thereby controlling the operation. Further, those codes are stored into a parameter memory 607 and are properly transmitted to a predetermined block.

In the diagram, reference numeral 608 denotes a motion compensation unit; 609 a rate control unit; 610 an encoding buffer unit; and 611 a decoding buffer unit.

The input image data which is transmitted through the encoding buffer unit 610 or the motion vector data and difference value (data to be encoded) which are transmitted from the motion compensation unit 608 are sequentially processed by: a conversion unit 612 comprising a plurality of DCT circuits and inverse DCT circuits (IDCT circuits); a quantization unit 613 comprising a plurality of quantization circuits (Q) and inverse quantization circuits (IQ); and a variable length encoding unit 614 comprising a plurality of variable length coding circuits (VLCs) and variable length decoding circuits (VLDs). The resultant processed data is stored into the decoding buffer 611 which functions as an output buffer and is outputted through the data bus and interface 603 at a predetermined timing which is instructed by the CPU 604.

The quantization unit 613 has a quantization table 613A. The variable length encoding unit 614 has a Huffman table 614A. Various parameters such as quantization steps, Huffman code, and the like which are necessary when processes are executed in those units are properly transferred into those tables from the parameter memory 607.

Encoding data (data to be decoded) that is transmitted through the decoding buffer 611 is sequentially processed by the variable length encoding unit 614, quantization unit 613, and conversion unit 612. The resultant processed data is stored into the encoding buffer unit 610 which functions as an output buffer and is outputted through the data bus and interface 603 at a predetermined timing which is instructed by the CPU 604.

The motion compensation unit 608 executes a motion compensation of the P frame and B frame upon encoding and decoding by using a reference buffer 615. In the embodiment, the motion compensation unit 608 is commonly used for the operation to obtain the difference value of the DC component upon JPEG encoding.

Further, reference numeral 616 denotes a bus arbiter for arbitrating the data buses in pipeline processes or the like.

Such a codec receives an instruction from the CPU 503 of the personal computer main body and makes each predetermined unit operative by the CPU 604, thereby performing the encoding or decoding.

In the the codec, in case of simultaneously executing the encoding and decoding processes of a plurality of systems, in the case of simultaneously performing the encoding and decoding processes in the parallel, in case of executing various processes such as communication, display, print-out, and the like in the personal computer main body and the encoding and decoding processes in parallel, or the like, the data transfer control for each of the above units and the operation control are executed by the optimum sequence in accordance with various processing styles, an operation program corresponding to such a sequence has previously been stored in the RAM 605.

The program stored in the RAM 605 can be properly updated.

The personal computer as mentioned above executes the following regulating operation on the basis of the regulation data.

First, the personal computer communicates with the CATV station through the ATM line on the basis of the foregoing regulation program and transmits a predetermined key requested by the CATV station, so that the CATV station accepts a request of the software (S1).

The software which is transmitted from the CATV station has been set in accordance with the above key. The software can be provided in accordance with an accessing ability of the user.

After that, the personal computer judges whether the regulation data exists in the software data transmitted from the CATV station in accordance with the request or not (S2). When the regulation data is detected, the contents of the regulation data are set (S3).

After that, by receiving a command input by the user (S4), a check is made to see if the inputted command is a target of the regulation or not (S5).

If the input command is the target of the regulation, such a fact is notified to the user (S6). The contents of the regulation are displayed (S7). After that, the processing routine is returned to step S4.

When the input command is not the target of the regulation, the command is executed (S8). The contents of the command and an execution time are transmitted to the CATV station 127 (S9).

After that, the personal computer waits for the return of an amount of charging and the like from the CATV station 127 (S10). The processing routine is finished at a stage when the return arrives.

As will be obviously understood from the above description, according to the embodiment, the software used by the user can be monitored by the management center and the use of the user can be regulated.

By transmitting the using time and use style to the management center, the management center can also manage the charges.

What is claimed is:

1. A management system of software data, comprising:
    a center for transmitting software data including regulation data to regulate an effective period of said software data;
    a transmitting system for transmitting said software data and said regulation data from said center to a terminal apparatus; and
    a terminal apparatus for receiving and storing said software data transmitted through said transmitting system, detecting said received regulation data, and regulating a use of said software data on the basis of said regulation data by using a regulation program previously stored in said terminal apparatus, wherein said regulation program automatically deletes said software data from said terminal apparatus that received said data from said center after the elapse of said effective period of the software data and transmits notice of completion of said deletion to said center coincident with deletion of said software data from said terminal apparatus.

2. A system according to claim 1, wherein said transmitting system comprises a network.

3. A system according to claim 2, wherein said network comprises an ATM network.

4. A system according to claim 1, wherein said terminal apparatus comprises display means for displaying contents of said regulation data.

5. A terminal apparatus comprising:
    input means for inputting software data including regulation data to regulate an effective period of said software data, the software data being transmitted to said terminal apparatus by a center for transmitting said software data;
    storage means for previously storing a regulation program corresponding to said regulation data; and
    control means for extracting said regulation data from said software data and automatically deleting said software data from said terminal apparatus after the elapse of said effective period of the software data on the basis of said regulation data, and transmitting a notice of completion of said deletion to the center for transmitting said software data coincident with deletion of said software data from said terminal apparatus.

6. An apparatus according to claim 5, wherein said storage means comprises a hard disk device.

7. An apparatus according to claim 5, wherein said regulation means comprises a CPU and a memory controller.

8. An apparatus according to claim 7, wherein said CPU retrieves said regulation data on the basis of said regulation program.

9. An apparatus according to claim 8, wherein said memory controller automatically deletes said software data on the basis of instructions from said CPU.

10. A center for transmitting software data to a terminal through a predetermined transmitting system, comprising:
    means for transmitting to said terminal said software data and regulation data to regulate an effective period of said software data;
    means for receiving a notice of completion of automatic software deletion from said terminal that received said data from said center after the elapse of said effective period of the software data, the notice being transmitted by said terminal to said center coincident with completion of an operation in said terminal to delete said software data from said terminal after the elapse of said effective period; and means for managing the presence of said software data at each of a plurality of terminals on the basis of said notice.

11. A recording medium storing computer-executable process steps to be performed in a terminal apparatus, the executable process steps comprising the steps of:

inputting software data including regulation data to regulate an effective period of said software data, the software data being transmitted to the terminal apparatus by a center for transmitting the software data;

previously storing a regulation program corresponding to said regulation data;

extracting said regulation data from said software data;

automatically deleting said software data from said terminal apparatus that received said data after the elapse of said effective period of the software data on the basis of said regulation data; and transmitting a notice of completion of said deletion to the center for transmitting said software data coincident with deletion of said software data.

12. A recording medium storing computer-executable process steps to be performed in a center for transmitting software data to a terminal through a predetermined transmitting system, the executable process steps comprising the steps of:

transmitting to said terminal said software data and regulation data to regulate an effective period of said software data;

receiving a notice of completion of automatic software deletion from said terminal that received said data from said center after the elapse of said effective period of the software data, the notice being transmitted by said terminal to said center coincident with completion of an operation in said terminal to delete said software data from said terminal after the elapse of said effective period; and managing the presence of said software data at each of a plurality of terminals on the basis of said notice.

* * * * *

UNITED STATES PATENT AND TRADEMARK OFFICE
CERTIFICATE OF CORRECTION

PATENT NO. : 6,516,318 B2  Page 1 of 1
DATED : February 4, 2003
INVENTOR(S) : Kenji Nakamura et al.

It is certified that error appears in the above-identified patent and that said Letters Patent is hereby corrected as shown below:

<u>Title page,</u>
Item [*] Notice, insert -- This patent issued on a continued prosecution application filed under 37 CFR 1.53(d), and is subject to the twenty year patent term provisions of 35 U.S.C. 154(a)(2) --.

<u>Column 3,</u>
Line 64, "the" should be deleted.

<u>Column 4,</u>
Line 7, "software use" should read -- software-use --; and
Line 16, "form in" should read -- from --.

<u>Column 6,</u>
Line 44, "eliminated" should read -- eliminated, --; and
Line 50, "to point" should read -- to the point --.

<u>Column 11,</u>
Line 5, "herein-" should read -- below --; and
Line 6, "later." should be deleted.

<u>Column 13,</u>
Line 15, "the the codec, in case" should read -- the codec, in the case --; and
Line 18, "in the parallel, in case" should read -- in parallel, in the case --.

Signed and Sealed this

Eighteenth Day of November, 2003

JAMES E. ROGAN
*Director of the United States Patent and Trademark Office*